(12) United States Patent
Frankie et al.

(10) Patent No.: US 6,347,627 B1
(45) Date of Patent: Feb. 19, 2002

(54) NITROUS OXIDE BASED OXYGEN SUPPLY SYSTEM

(75) Inventors: Brian M. Frankie; Robert M. Zubrin; Scott E. Lowther, all of Denver, CO (US)

(73) Assignee: Pioneer Inventions, Inc., Denver, CO (US)

( * ) Notice: Subject to any disclaimer, the term of this patent is extended or adjusted under 35 U.S.C. 154(b) by 0 days.

(21) Appl. No.: 09/064,998

(22) Filed: Apr. 23, 1998

(51) Int. Cl.$^7$ ............................................... A61M 16/00
(52) U.S. Cl. ............................ 128/201.21; 128/200.24; 128/201.27; 128/202.26; 128/203.12; 128/203.24; 128/204.29
(58) Field of Search ..................... 128/201.21, 202.26, 128/203.12, 203.14, 203.24, 204.17, 201.27, 200.24, 204.29, 205.11, 204.26, 205.12; 62/46.1; 423/239

(56) References Cited

U.S. PATENT DOCUMENTS

| | | | |
|---|---|---|---|
| 3,227,208 A | * | 1/1966 | Potter, Jr. et al. ........ 128/201.21 |
| 3,318,307 A | * | 5/1967 | Nicastro ................ 128/201.21 |
| 3,570,481 A | * | 3/1971 | Woodberry, Jr. ........ 128/201.21 |
| 3,699,775 A | * | 10/1972 | Cowans ................. 128/201.21 |
| 3,722,179 A | * | 3/1973 | Moen et al. .................... 55/40 |
| 3,730,178 A | * | 5/1973 | Moreland .............. 128/201.21 |
| 3,876,773 A | | 4/1975 | Bracken ..................... 424/161 |
| 3,958,949 A | | 5/1976 | Plantif et al. |
| 4,002,431 A | | 1/1977 | Lewis |
| 4,046,888 A | | 9/1977 | Maeshima et al. .......... 423/239 |
| 4,181,126 A | * | 1/1980 | Hendry .................. 128/201.21 |
| 4,206,429 A | | 6/1980 | Pinsley |
| 4,297,328 A | | 10/1981 | Ritscher et al. .......... 423/213.2 |
| 4,473,535 A | | 9/1984 | Kittrell et al. |
| 4,867,954 A | | 9/1989 | Staniulis et al. |
| 4,877,743 A | | 10/1989 | Waugh et al. |
| 5,043,150 A | | 8/1991 | Hiltunen et al. |

(List continued on next page.)

OTHER PUBLICATIONS

Armor and Farris, "The Unusual Hydrothermal Stability of Co–ZSM–5," *Applied Catalysis B: Environmental*, vol. 4, 1994, pp. L11–L17.

Braker and Mossman, "Nitrous Oxide," *The Matheson Unabridged Gas Data Book*, 1975. Matheson, East Rutherford, New Jersey, , pp. 550–556.

Chang, McCarty, Wachsman, and Wong, "Catalytic Decomposition of Nitrous Oxide over Ru–exchanged Zeolites," *Applied Catalysis B: Environmental*, vol. 4, 1994, pp. 283–299.

Couch, and Kobe, J. "Volumetric Behavior of Nitrous Oxide Pressure–Volume Isotherms at High Pressures," *Chem and Eng. Data*, vol. 6, No. 2, 1961, pp. 229–237.

Kannan and Swamy, "Catalytic Decomposition of Nitrous Oxide on "in situ" generated thermally calcined Hydrotalcites," *Applied Catalysis B: Environmental*, vol. 3, 1994, pp. 109–116.

Li and Armor, "Catalytic Decomposition of Nitrous Oxide on Metal Exchange Zeolites," *Applied Catalysis B: Environmental*, vol. 1, 1992, pp. L21–L29.

(List continued on next page.)

*Primary Examiner*—John G. Weiss
*Assistant Examiner*—V. Srivastava
(74) *Attorney, Agent, or Firm*—Dorsey & Whitney LLP

(57) ABSTRACT

A self-contained system which converts nitrous oxide to a breathable gas mixture of nitrogen and oxygen. In the preferred embodiment of the present invention, a portable system is disclosed wherein liquefied nitrous oxide is converted to a breathable gas mixture of nitrogen and oxygen. The decomposition occurs over a catalyst bed which is all contained in a small reactor. The invention is useful for underwater, fire fighting and outer space applications.

47 Claims, 4 Drawing Sheets

U.S. PATENT DOCUMENTS

| | | | |
|---|---|---|---|
| 5,059,569 A | | 10/1991 | Deschamps et al. |
| 5,094,235 A | * | 3/1992 | Westenskow et al. ... 128/204.22 |
| 5,099,645 A | | 3/1992 | Schuler et al. |
| 5,137,703 A | * | 8/1992 | Lichtin et al. .............. 423/239 |
| 5,169,415 A | * | 12/1992 | Roettger et al. ....... 128/204.29 |
| 5,171,553 A | * | 12/1992 | Li et al. ..................... 423/239 |
| 5,200,162 A | | 4/1993 | Riley et al. |
| 5,306,350 A | | 4/1994 | Hoy et al. |
| 5,314,673 A | * | 5/1994 | Anseth et al. ........... 423/239.1 |
| 5,511,542 A | * | 4/1996 | Hall ...................... 128/201.21 |
| 5,589,151 A | | 12/1996 | Gary |
| 5,630,410 A | * | 5/1997 | Kayar et al. ........... 128/200.24 |
| 5,669,629 A | | 9/1997 | Rink |
| 5,678,536 A | * | 10/1997 | Martin .................. 128/201.21 |
| 5,964,221 A | * | 10/1999 | McKenna .............. 128/205.12 |
| 5,979,440 A | * | 11/1999 | Honkonen et al. ..... 128/201.21 |

OTHER PUBLICATIONS

Li and Armor, "Simultaneous, Catalytic Removal of Nitric Oxide and Nitrous Oxide," *Applied Catalysis B: Environmental*, vol. 3, 1993, pp. 55–60.

Miller and Grassian, "Environmental Catalysis: Adsorption and Decomposition of Nitrous Oxide on Zirconia," *J. Am. Chem. Soc.*, vol. 117, No. 44, 1995, pp. 10969–10975.

Oi, et al., "Catalytic Decomposition of $N_2O$ over Rhodium–Loaded Metal Oxides," Chemistry Letters, 1995, pp. 453–454.

Stoelting and Miller, *Basics of Anesthesia*, $2^{nd}$ Edition, 1989, pp. 1–3; 13–15; 140; 151.

Zeng, et al., "Monoclinic $ZrO_2$ and its Supported Materials Co/Ni/$ZrO_2$ for $N_2O$ Decomposition," *J. Mater. Res.*, vol. 10, No. 3, Mar. 1995, pp. 545–552.

Honeywell Brochure, 10/96.

Honeywell, Continuous Pulping Advanced Control, 2/97, pp. 1–7.

Honeywell, Washing Advanced Control, 2/97.

Honeywell, Batch Pulping Advanced Control, 2/97.

Honeywell, Cookstar 400 Series Liquor Strength Sensor, 2/97.

News Release, Honeywell Introduces Pulp and Paper Industry's Fastest Scanner (No date avail).

* cited by examiner

NITROUS OXIDE BASED OXYGEN SUPPLY SYSTEM

FIELD OF THE INVENTION

The present invention describes a system for the conversion of nitrous oxide into a breathable gas mixture consisting of nitrogen and oxygen. The system may optionally be fitted with an air separation membrane to enrich the breathable gas in oxygen.

BACKGROUND OF THE INVENTION

Self-contained breathing apparatus (SCBA, or SCUBA, for the underwater variety) systems are currently used in an enormous number of applications. People such as fire fighters and hazardous (nuclear, biological and chemical) material workers regularly find themselves in unhealthy and even toxic atmospheres, and have to wear air or oxygen tanks. SCBA systems are also an essential part of the spacesuits used by NASA astronauts in extravehicular activities. Many military planes and submersibles carry a supply of liquid oxygen to provide breathing gas for the crews. High altitude climbers regularly use compressed oxygen supply systems. Finally, underwater SCUBA systems are used by various people, including military divers, underwater workers, search and recovery divers, and more than 3 million recreational divers in the United States alone.

Current SCBA systems primarily utilize compressed air. This works, but suffers from excessive mass, as the air tanks must be built to withstand several thousand pounds per square inch (psi) internal pressure. In addition, supply systems are inherently dangerous at these pressures, as tanks or fittings can burst. Finally, the nitrogen and oxygen in air are permanent gases at ambient temperatures, which means that they are very low density even at extremely high pressures (>200 bar), unless they are cryogenically liquefied. Thus, SCBA systems are either heavily insulated cryogenic tanks or very large and heavy gaseous air tanks.

For example, a common fire fighting air pack includes a compressed (standard atmospheric composition) air tank designed for thirty minutes duration, although, in the real world of excitement and exertion, this is usually somewhat optimistic. The tank contains 1.53 standard $m^3$ of air compressed to 4500 psi (310 bar). Thus, this tank, which weighs about 23 kg, holds about 0.5 kg of oxygen.

Standard SCUBA tanks typically contain 11.1 liters of an oxygen/nitrogen mix (79% nitrogen, 21% oxygen, standard atmospheric mix) under about 3000 psi (207 bar), which is approximately 2.27 standard $m^3$. This provides a total of about 2.9 kilograms of air (0.68 kg of which is oxygen) which is usually enough for about 30 minutes to one hour underwater. Underwater diving is different from use on land because of the increased pressure at diving depths. This has two effects. First, because of the higher density of the gas at higher pressures, each breath, assuming a constant volume, consumes more of the stored air. The second effect is that at higher pressures, nitrogen present in the air mixture is dissolved into the blood. While at diving depth, this is of little concern, but if the diver attempts to return to the surface too quickly, the nitrogen will quickly come out of solution and form bubbles in the bloodstream. This phenomenon is the cause of "the bends," a familiar diving problem that in extreme cases can cause severe pain and death. The result of both of these effects is that the deeper a diver is, the less time he/she can remain there.

To help alleviate the problems associated with diving at depth, a SCUBA mix called "nitrox," is used. Nitrox is enriched to (depending on intended use) 32% to 36% percent oxygen with the rest nitrogen. The increased oxygen content reduces both the absorption of nitrogen in the blood and the quantity of the gas mixture that must be inhaled with each breath, and thus extends the permissible depth and length of dives. However, it is still limited in that a portable tank cannot hold very much breathable gas.

Nitrous oxide is not by itself a breathable gas. Nitrous oxide has a long history of use as an anesthetic. It was first used for surgery in 1799, but found its primary employment in dental anesthesia, where it was first used in 1844. However, anesthetic applications typically employ $N_2O$ in a 60%–75% concentration with air to achieve the desired effects. In concentrations of less than 30%, $N_2O$ is incapable of causing deep anesthesia.

Nitrous oxide has recently received increased attention as a greenhouse gas pollutant and as a contributor to ozone destruction. The major manmade source of nitrous oxide emissions is from the production of adipic acid, which is used in the synthesis of nylon monomers. Several methods have been researched for catalytically decomposing $N_2O$ from these sources into nitrogen and oxygen to limit the negative environmental effects. Since $N_2O$ mole percentage in these streams is generally less than 10%, the majority of research has focused on nitrous oxide decomposition in dilute amounts.

U.S. Pat. No. 5,137,703 claims a method for thermal catalytic decomposition of nitrogen oxides into molecular oxygen and nitrogen using a variety of catalysts, including mixtures of noble metals, transition metal oxides and group III metal oxides. This patent is primarily aimed toward decomposition of NO and $N_2$ waste gases from industrial power plants.

U.S. Pat. No. 5,171,553 describes catalyst activities specifically for the decomposition of $N_2O$. The patent describes the use of common noble metal catalysts on inert supports such as alumina. The supports were replaced with noble metal-exchanged crystalline zeolites. While the zeolite without the metal atoms was non-catalytic toward $N_2O$ decomposition, when metal-exchanged it provided superior performance over standard catalyst supports.

U.S. Pat. No. 5,314,673 describes a method for decomposition of streams of up to 100% $N_2O$ over a tubular reactor filled with cobalt oxide and nickel oxide on zirconia catalyst.

There is a need for a breathable gas mixture which can be carried in a compact fashion and which can last a long time.

There is a need for a compact source of breathable gas which is safe and easy to use.

There is a need for a portable, breathable gas supply unit which will supply gas for a longer period of time than traditional SCBA tanks.

There exists a need for a portable supply tank of gas which can be oxygen enriched.

There exists a need for supplying warmth to underwater divers or astronauts under certain conditions.

BRIEF SUMMARY OF THE INVENTION

The present invention is a complete system for efficiently decomposing nitrous oxide to nitrogen and oxygen, and supplying the resulting gas mixture to a breathing apparatus. The portable system consists of a compact nitrous oxide supply system, a catalytic decomposition reactor, a breathable gas storage reservoir, a mouthpiece, and appropriate controls. It may optionally include an air separation membrane to enrich the breathing gas in oxygen before supplying it to the user. The system can be used in a variety of locations and for numerous applications, including those listed herein.

High conversion of nitrous oxide to nitrogen and oxygen can be achieved by utilizing an oxidized metal catalyst on an inert support or a metal substituted crystalline zeolite at temperatures above 250° C. A preheat to at least 150° C. is required to raise the reactor temperature to the desired level, after which energy from the exothermic decomposition of the nitrous oxide is sufficient to maintain the reaction temperature. The preferred preheat configuration uses an internal or external electrical heating element, but chemical ignition or other heating methods are also possible.

The decomposed nitrous oxide can be supplied directly to the breathing system user or it can be optionally enriched using a selective membrane. The oxygen levels from nitrous oxide decomposition can be boosted above 70 mole percentage with a once through air separation membrane that separates oxygen from the nitrogen and residual $N_2O$ in the catalytic reactor exhaust. The warm $N_2O$ gas produced can also be used to provide heat to a dry suit or spacesuit prior to consumption.

DETAILED DESCRIPTION OF THE INVENTION

Broadly, the present invention is directed to a relatively compact unit which supplies breathable gas to a human being or other animal. The system uses nitrous oxide as a base or starting reactant. Nitrous oxide is stored in a liquid state in a pressurized tank. The liquefied nitrous oxide is thereafter, upon demand, bled from the stored nitrous oxide tank through at least one valve into a reactor. The reactor utilizes a catalyst which converts the nitrous oxide to a mixture of nitrogen and oxygen which has a reaction product of approximately 66.7% nitrogen and 33.3% oxygen. Thereafter the reaction product ratio may be passed on directly to the user or may be passed through a membrane which would affect the oxygen/nitrogen ratio of the breathable gas.

The anticipated applications of the present invention include, but are not limited to portable breathing systems for fire fighters or nuclear, biological, and chemical material workers, portable underwater breathing tanks, underwater stationary tanks to provide a breathable gas to occupants in an underwater dwelling or submarine, portable space tanks for breathing gas either at high altitudes (mountain climbers and fighter pilots) or for astronauts. Finally, the present invention may be used in orbiting space stations, space vehicles, or other vehicles or dwellings which do not have ready access to breathable gas.

Figure 1:
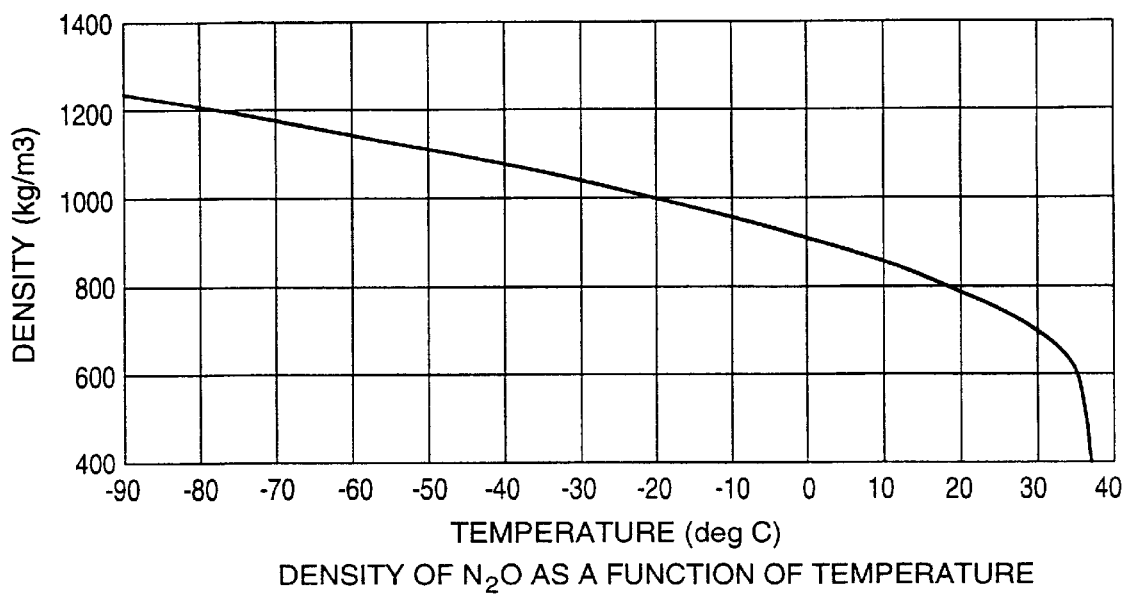
FIG. 1 shows liquid density as a function of temperature for nitrous oxide.
Figure 2:
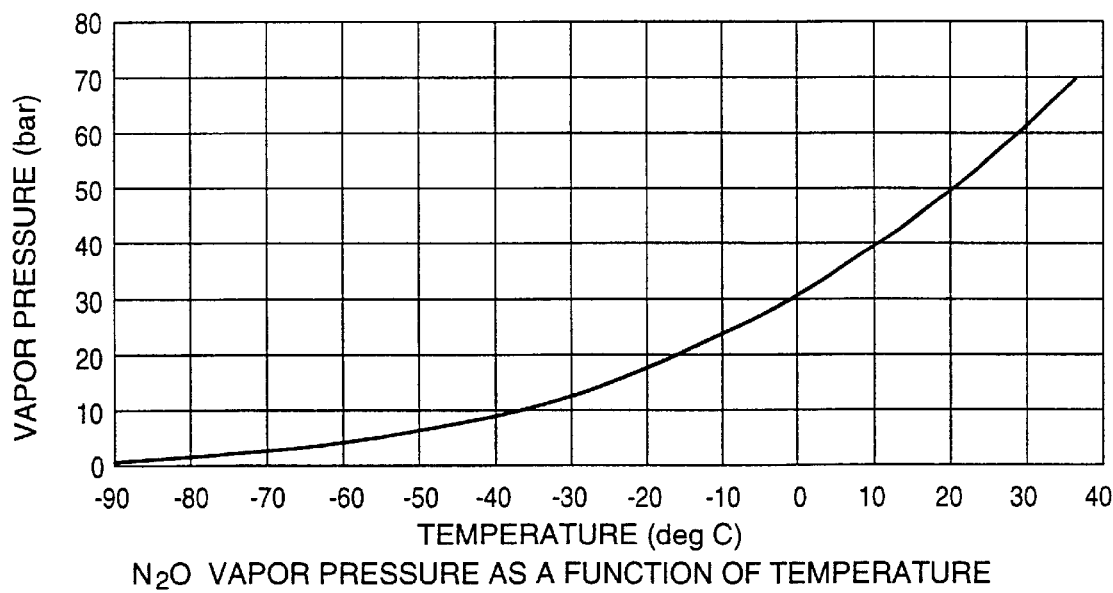
FIG. 2 shows vapor pressure as a function of temperature for nitrous oxide.

Nitrous oxide, $N_2O$, is a common and inexpensive storable chemical that in the present invention is used as a convenient, low cost, lightweight, safe, and reliable source of oxygen and nitrogen to supply a long duration breathing system. It is storable as a liquid at atmospheric pressure and about −90° C., or at ambient temperatures and about 50 bars pressure. The density and vapor pressure of liquid nitrous oxide as a function of temperature are shown in FIGS. 1 and 2. When heated to a temperature of about 600° C., nitrous oxide will spontaneously decompose to a gaseous mixture consisting of one-third oxygen and two-thirds nitrogen by mole. By using a catalyst, the temperature at which the decomposition reaction occurs can be lowered.

Nitrous oxide is an endothermic molecule, containing about 81.6 kJ/mole enthalpy more than molecular oxygen and nitrogen at 298° K. Thus, based on the energy balance, the molecule is unstable and should spontaneously decompose to oxygen and nitrogen, according to reaction 1:

$$N_2O \rightarrow N_2 + \tfrac{1}{2}O_2 + 81.6 \text{ kJ} \qquad (1)$$

All that is required for reaction 1 is sufficient kinetic activity to allow the decomposition to proceed. This decomposition will occur in the gas phase and almost to completion at about 600° C., or at lower temperatures when an appropriate catalyst is present. It is also an aspect of this invention that the thermal energy provided by the exothermic decomposition of the nitrous oxide can be used to supply warmth to divers using this system with an appropriately designed drysuit. As an example, assume a person is using about 3 standard liters per minute of nitrous oxide (6 grams/minute, or 4.5 standard liters per minute of breathable gas), which is a reasonable amount for mild exertion. As it decomposes, this amount of nitrous oxide produces 11 kJ per minute (182 watts) of thermal energy. This is approximately four times the amount of thermal energy a human body normally produces, which means that it should be able to keep a person warm underwater.

The primary advantage of the present invention's nitrous oxide based breathing system over existing systems is the high density of the stored oxygen without high pressure or cryogenic requirements. This increases the amount of breathable oxygen that can be generated from the same volume and a reduced mass.

The proposed nitrous oxide based oxygen storage system is lightweight, safe, self-regulating, and relatively simple and inexpensive. Unlike the components in air, molecular oxygen and nitrogen, nitrous oxide is storable as a liquid at reasonable temperatures and pressures. The density of liquefied (mildly pressurized to 31.4 atmospheres) nitrous oxide at 0° C. is comparable to that of much colder cryogenically liquefied nitrogen and oxygen.

A comparison of the storage temperatures, pressures, and densities of $N_2O$ with both gaseous and liquid nitrogen and oxygen is shown in Table 1. It can be seen that at comparable temperatures and one-third the pressure, $N_2O$ is about four times more dense than compressed air.

TABLE 1

Densities of Liquid $N_2$, Gas $N_2$, Liquid $O_2$, Gas $O_2$ and $N_2O$

|  | $LN_2$ | $GN_2$ | $LO_2$ | $GO_2$ | $N_2O$ |
| --- | --- | --- | --- | --- | --- |
| Temperature (C) | −195 | 20 | −183 | 20 | 20 |
| Pressure (kPa) | 101 | 15000 | 101 | 15000 | 4970 |
| Density (kg/m³) | 808 | 172 | 1149 | 197 | 782 |

Decomposed nitrous oxide will produce a mixture of two parts nitrogen and one part oxygen by mole, making it an ideal air supply for a SCBA system. To produce this same mixture using cryogenic nitrogen and oxygen, heavily insulated tanks would be needed, with an average liquid density of 921.7 kg/cubic meter. This is little different than the density of nitrous oxide, which requires no insulation, and much less weight and plumbing. Alternatively, if compressed air tanks were used, the volume of the tanks would have to be roughly four times larger than the nitrous oxide based system and be built to withstand three times the pressure to contain the same amount of gas. This would result in a tank that is 12 times as heavy, which would clearly be not as portable. By the term portable, it is meant that the supply tank may be carried by one average adult on his or her back. Thus, the present invention provides about 12 times as much gas when compared to a SCBA tank of the same weight carrying ambient air.

Thus, the same mass of oxygen as in a firefighter's air pack (5 liters, 4500 psi), 0.5 kg, can be provided by 1.4 kg of nitrous oxide. If pressurized only enough to liquefy the nitrous oxide (735 psi/50 bar at 20° C.), the $N_2O$ will fill a sphere only 13 cm in diameter, although small cylindrical tanks may be the preferred geometry, as they would be small enough to fit under protective clothing. Not only is there considerable weight reduction, but the tank is significantly smaller, which is of material benefit in an emergency situation where protuberances may snag objects and hinder the fire fighter's job.

For SCUBA applications, if a normal, 11.1 liter, displacement tank were used, 8.7 kilograms of nitrous oxide could be stored in the tank at 20° C. and 50 bar. This would provide 3.2 kilograms of oxygen. Thus, a nitrous oxide based oxygen supply system can be made that would hold breathable oxygen at four times the density of current systems and at 33% the required pressure. A smaller and lighter specially designed tank could be used for dives of the same duration, or tanks equal in volume to current tanks (but lighter, by a factor of three, not including the stored components) could be used for greatly lengthened dives of roughly four times the current time period.

In addition, the composition the nitrous oxide system will produce is essentially the same as the nitrox mix. Although there is less nitrogen in the $N_2O$ system than in air mixtures, nitrous oxide SCUBA systems would still have limited diving depth due to nitrogen in the mix. But this would be offset by the much lighter weight it would provide. Divers who do not need to go to great depth would be unaffected by depth restrictions. Therefore, underwater times at shallow depths could be extended by a factor of five or more, or, alternatively, the $N_2O$ SCUBA system could be built much smaller and lighter than standard SCUBA gear, allowing divers to carry additional equipment.

Nitrous oxide can be made even more dense by further cooling; at −88° C. and one atmosphere pressure it has a density of 1281.5 kg/cubic meter. A SCBA system with such a cold storage nitrous oxide breathing system would be very lightweight and have the potential of considerably extended duration, at the expense of increased insulation requirements. An application of this nature would potentially be very competitive and certainly much safer than the liquid oxygen systems used onboard aircraft and submersibles.

Figure 3:
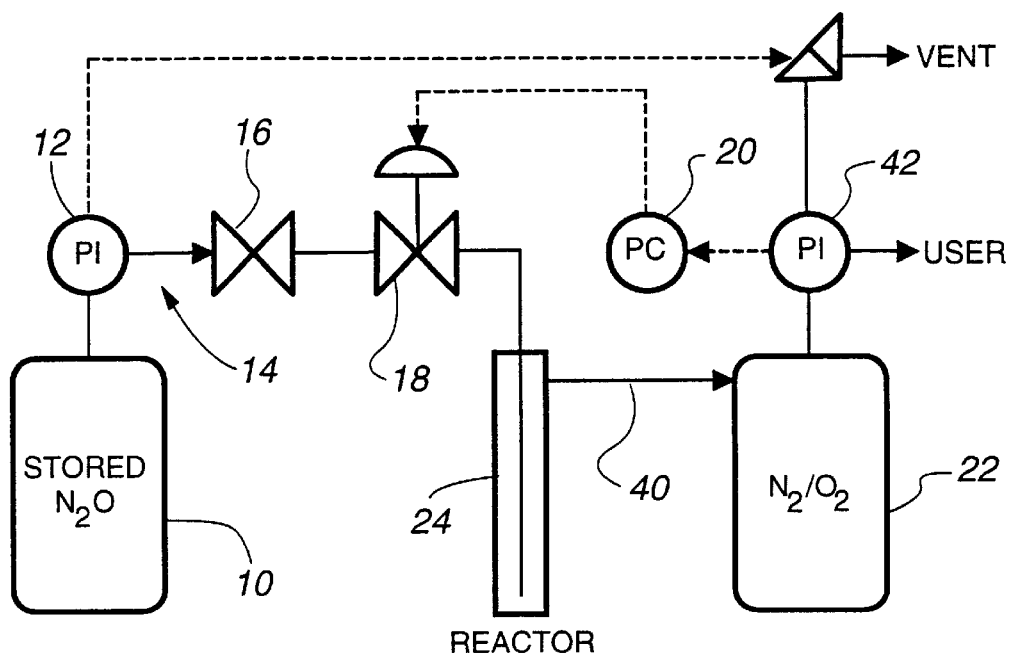
FIG. 3 illustrates the process arrangement and controls of the basic nitrous oxide based breathing apparatus concept.
Figure 4:
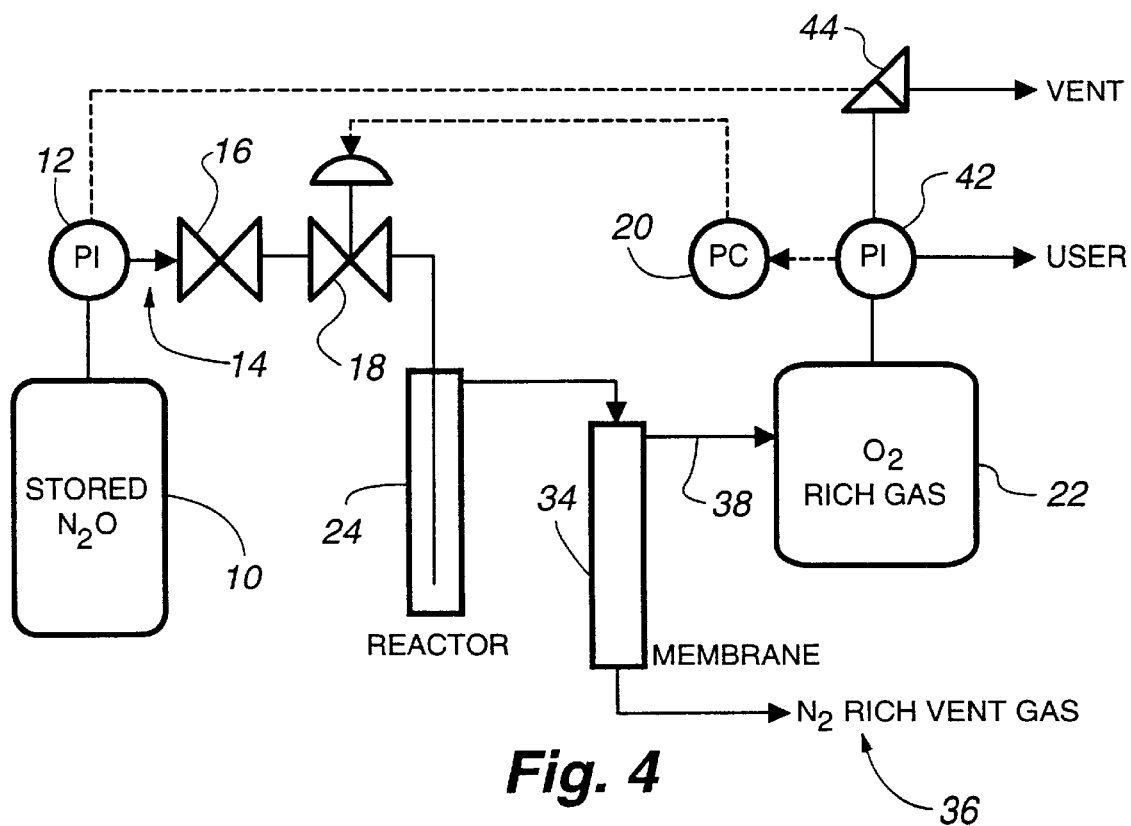
FIG. 4 illustrates the process arrangement and controls of the nitrous oxide based breathing apparatus including a selective membrane to provide an enriched oxygen supply.

The system, with and without a selective membrane for oxygen enrichment, is shown in FIGS. 3 and 4. Referring to FIGS. 3 and 4, the following is a description of an example of the apparatus and method of the present invention.

Liquid nitrous oxide is stored in a supply tank 10 at ambient temperature and about 40–50 bar. The tank may be the size of present SCUBA tanks or may be smaller. Gaseous nitrous vapors are drawn off through a pressure regulator 12, with the downstream regulator pressure 14 typically set about 25–30 bar less than the supply tank 10 pressure. The pressure regulator 12 is a typical regulator available in SCUBA supply stores.

The $N_2O$ flows through a manual shutoff valve 16 and a flow control valve 18 receiving a feedback signal from the pressure indicator 20 on the breathing gas surge supply vessel 22. The manual shutoff valve 16 allows the user to stop the flow of $N_2O$ from the supply tank 10. The flow control valve 18 is sized to deliver the appropriate volume of nitrous oxide gas for the desired application.

Figure 5:
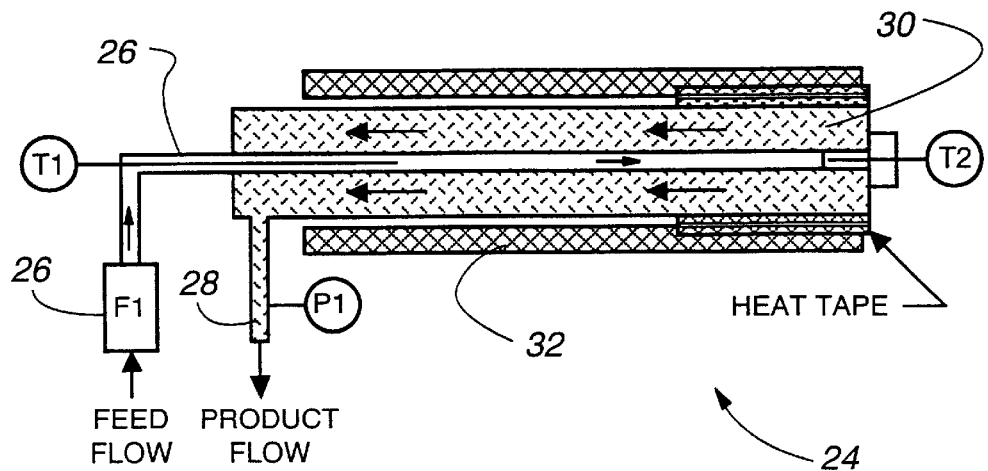
FIG. 5 shows the details of the catalytic nitrous oxide decomposition reactor developed by the applicants.

The nitrous oxide flows into the decomposition reactor 24. An enlarged view of the preferred decomposition reactor is shown in FIG. 5. The gas flows axially through a tube in the center 26 of the decomposition reactor 24, receiving a preheat from the reactor effluent 28. At the bottom of the reactor, it flows into the catalyst-filled annular region 30 around the feed tube, decomposing into nitrogen and oxygen on the hot catalyst. There are numerous catalysts that are expected to work, with the preferred being oxidized noble metal catalysts supported on alumina, including ruthenium on alumina. Other catalysts can be made from the other noble series metals, including rhodium, iridium, palladium, osmium, and platinum. Transition metal oxides, including cobalt, titanium, vanadium, iron, copper, manganese, chromium, and nickel oxides have also been shown to catalyze the $N_2O$ decomposition reaction. These metals can be supported on porous alumina, zirconia, or yttria substrates. In addition, crystalline zeolites having a structure type selected from the BETA, MOR, MFI, MEL, or FER IUPAC designations with the sodium or potassium ion-exchanged for one of the noble metals listed above are expected to work very well.

Ignition of the nitrous oxide decomposition reactor involves contacting a nitrous oxide flow with a small local heat source. In the apparatus developed and described herein, an external 125 watt heat tape was used to heat the decomposition reactor to about 150° C., at which point the exothermic decomposition of the nitrous oxide is sufficient to increase the reactor to normal operating temperature. After the temperature has reached the ignition point of nitrous oxide, power to the heat tape can be turned off.

Alternative methods of igniting the nitrous oxide system are available. One of the alternatives is an internal electric cartridge heater. This heater can place the necessary heat directly on the inlet nitrous oxide stream without wasting energy heating the reactor walls and catalyst. Alternatively, an electric spark or a small pyrotechnic charge can accomplish the same objective. In the present invention, electric cartridge heaters are the preferred embodiment.

Preferably, insulation 32 is wrapped around reactor 24. This insulation 32 maintains heat in the reactor 24 and also prevents injury from accidental touching of the reactor 24. The reactor 24 operates between about 250° C. and 900° C., with a preferred operating temperature of about 500–700° C.

When the optional selective membrane 34 is present, as shown in FIG. 4, the effluent from the reactor 24 flows into the manifold leading to a group of hollow fibers. Oxygen diffuses across the polymeric membrane material 34 faster than nitrogen, creating a higher concentration of oxygen on the outside of the hollow fibers. The residual nitrogen flows the length of the membrane, and is vented at 36.

The oxygen enriched stream 38 from the membrane 34 or the direct reactor exhaust 40 (if a membrane is not present) flows to the breathing gas surge vessel 22. This vessel is about 2–4 liters in size, and provides a breathable reservoir at a pressure of 5 to 30 bar of several minutes, thus allowing the reactor inlet control valve 18 time to ramp the flow rate gradually.

Because the rate of flow through the reactor 24 is determined by the pressure difference between the reservoir 22 and the pressure upstream of control valve 18, the lower the reservoir pressure is, the faster gas will flow. This feature provides the system with automatic feedback, making gas flow faster when faster flow is needed. If necessary, this system feedback can be further augmented by an active sensor and control system, such as that indicated in FIGS. 3 and 4 by 20.

Breathable gas from the surge vessel 22 flows through a normal SCBA tank regulator 42 to the end user. During startup of the apparatus, the user can open the purge valve on the SCBA regulator. This will vent undissociated nitrous oxide. After the reactor has reached steady state temperature, the user can vent the surge tank 22 one more time, after which it will fill with breathable gas.

The tank 26 used to store nitrous oxide can be similar to the tanks used by normal SCBA systems except that it is smaller, less massive, and only needs to be designed for a pressure of about 60 bar. Steel, aluminum, fiberglass, or carbon composite are the preferred materials of construction, and the tanks must be cleaned periodically to prevent contamination of the liquid nitrous oxide.

EXPERIMENTAL

The equipment arrangement used by the applicants to collect experimental data on nitrous oxide decomposition is shown in FIG. 5. This reactor was constructed of 1 inch OD stainless steel tube wrapped with three layers of glass insulating tape. The reactor configuration shown, with a long axial feed tube surrounded by an annular region filled with catalyst, has the advantage of being a double pipe heat exchanger, which preheats the feed and precools the exhaust. This traps the energy released during the decomposition of the nitrous oxide feed in one area of the reactor, increasing the precision of the thermal control. The amount of insulation is a critical parameter, as it must be sufficient to maintain the minimum required decomposition temperature while still allowing heat leak to balance the reaction heat generation without overheating the reactor.

The reactor requires a preheat of inlet fluid of nitrous oxide to reach the ignition temperature of nitrous oxide. During the experimental program, an external electric heat tape was wrapped around the bottom of the reactor near the reaction zone and the reactor was heated to above 150° C. with nitrous oxide flowing through the catalyst bed. Alternative solutions are to put a small electric filament inside the reactor, a small amount of chemical fuel, or a small sparker or pyrotechnic charge inside the reactor. Any of these solutions will require a short startup period before the apparatus starts dissociating nitrous oxide. Once the nitrous is exposed to a temperature of at least 150° C. in the presence of an appropriate catalyst, dissociation begins and the energy from the decomposition quickly heats up the reactor. The temperature typically stabilizes between 400 and 800° C., when heat leak from the reactor equals the heat generation from the reaction. Ideally, the temperature range should be in a range of about 500–700° C. This steady state temperature can be adjusted by changing the insulation around the reactor and the flow rate of nitrous oxide. Note also that, with an appropriate design, the thermal energy generated by the exothermic decomposition can be used to supply heat to divers using dry suits or to astronauts wearing spacesuits. This design would incorporate a fluid, such as water or the reactor effluent itself, to circulate through small passages on the inside of the drysuit, providing warmth to the diver.

The preferred materials of construction for the reactor are stainless steel or titanium. As nitrous oxide decomposes, small amounts of acid gases such as nitric oxide (NO) and nitrogen dioxide ($NO_2$) may also be created. These gases can attack materials such as aluminum or brass, so a material with high thermal and corrosion resistance is required. The undesirable chemicals can be catalytically decomposed in the reactor exhaust at 28 by platinum metal supported on alumina, zirconia, or yttria. The other noble metals will also work to decompose these chemicals, but platinum is the preferred embodiment. The reaction chamber can include a catalytic converter section to decompose the undesirable by-products. This can be done simply by placing a small amount of platinum-alumina pellets at the end of the reaction zone, immediately following the normal decomposition catalyst. If required, an absorbent filter such as activated carbon may be put on the exhaust stream to further eliminate undesirable chemicals. An additional method for corrosion prevention is to place a desiccant on the reactor inlet stream to eliminate water from the system, thus eliminating the acid reactions of the gases. These three methods (catalytic converter, adsorbent, desiccant) can be used individually or in any combination to eliminate harmful reaction products.

The decomposition can be accomplished in the gas phase at temperatures above 600° C., but it is preferable to lower the temperature for rapid ignition and dissociation to 150–200° C. by the use of an appropriate catalyst.

For high altitude, low ambient pressure locations, it may be desirable to increase the oxygen partial pressure in the decomposed nitrous mixture. For example, consider a person standing on the top of Mt. Everest, with 0.33 bar absolute pressure. An oxygen partial pressure of 0.2 bar would afford this person with the same amount of oxygen as is available at sea level on Earth. Thus, a breathing gas mixture that is 60% oxygen/40% nitrogen is required. This can be supplied by a nitrous oxide based breathing system incorporating a nitrous oxide decomposition reactor connected in series to a single small one-pass air separation membrane.

A commercially available hollow fiber gas separation membrane manufactured by the Permea Corporation has a 8:1 preferential permeability in passing oxygen compared to nitrogen, which is similar to membranes produced by other companies. Thus, when presented with a feed gas mixture that is 1:2 oxygen to nitrogen, it will pass a permeate gas mixture that is 4:1 oxygen to nitrogen. In the present application, the enrichment of the oxygen will not be that efficient, because as the feed gas passes along the length of the membrane, the partial pressure of oxygen in the feed stream falls as it is depleted by permeating through the membrane. Nevertheless, a single pass through a hollow fiber membrane unit will be sufficient to recover 90% of the oxygen in the feed stream and emerge with a gas that is about 70% oxygen and 30% nitrogen. If a second membrane is placed on the oxygen enriched permeate stream from the first membrane and used in a one pass system (i.e. no recycle) a gas product that is over 95% oxygen is feasible, with about 80% of the oxygen in the initial feed stream recovered. If a recycle system is used, then a gas product that is nearly 100% oxygen can be produced with better than 99% recovery of the initial supply. Such recycling systems require a pump and power supply, which would limit their application to larger systems.

The Permea air separation unit is 2 feet long and 2 inches in diameter and weighs less than 0.5 kg. It is capable of separating up to 15 liters of gas per minute, several times more than that needed by the nitrous oxide breathing system, with a pressure drop of about 4 bar. Since the stored $N_2O$ will be under pressure much greater than this, one or more membrane systems in series can be driven without the need for a pump or other power supply. The Permea unit shell is made of plastic and can operate satisfactorily as pressures ranging from 2 to 15 bar. If higher pressures are required, the shell can be reinforced or replaced with metal. The unit also may employ a recirculation pump, which would create a loop, thus resulting in a gas mixture of higher oxygen concentration. Finally, the membranes may be connected in series, again enriching the oxygen mole percentage of the gas.

The controls of the nitrous oxide based oxygen supply system have been optimized to provide a simple and flexible control scheme. The first control 16 is a manually controlled on/off valve that will isolate the nitrous supply tank 10 from the rest of the system. At the start of a dive (or other application), the user will open the valve, allowing nitrous into the system; after the dive, the user will turn it off. The second control is a minimum opening flow control valve 18. There are a variety of valves useful in this invention. A valve is not meant to be limiting and could be substituted with any throttling device such as a valve, orifice, regulator or other device to control flow. This valve 18 has a minimum opening stop that will allow the minimum nitrous flow required to maintain reactor temperature even when the valve stem has traveled to the full closed position. This valve 18 is controlled with a pressure signal from the breathable gas surge vessel. When the user requires more breathable gas, the surge vessel 22 pressure drops below the desired value, and the valve starts to open, increasing nitrous flow to the reactor and replenishing the surge vessel 22. As demand for breathable gas drops, the valve closes again to the minimum stop. The pressure signal can be transmitted either via a direct mechanical linkage using a balanced valve with a spring or a small amount of high pressure air, or with an electric signal and an electrically actuated valve. Even without an active control system, the variation of pressure drop through valve 18 caused by variation of the pressure in the breathing gas reservoir 22 should cause flow to increase when required and diminish when not. The final control is an overpressure relief valve 44 on the breathable gas surge vessel. This valve 44 will receive a setpoint from the pressure in the nitrous oxide storage tank, again either with a direct mechanical linkage using a balanced valve and spring or pressurized gas, or with an electrical signal. The setpoint will be at a chosen value of about 20–30 bar below the nitrous storage tank pressure, at which point the valve will open and vent vapor from the breathable gas surge vessel. This will prevent the pressure from building up to such a point in the surge vessel that minimum nitrous flow through the reactor is not maintained.

Active thermal control of the system is also possible, by varying the effective insulation, 32. At low flow rates, the insulation may be increased, reducing heat leak and maintaining good dissociation. At higher flow rates, the amount of insulation can be decreased, increasing heat leak and reducing maximum temperature. Numerous methods for active thermal control are available to those familiar with the art, including, but not limited to, movable insulation, variable thermal conductivity materials, and variable convective and/or conductive systems.

The applicants have run a series of experiments on a simple laboratory reactor apparatus created to study the decomposition of nitrous oxide using ruthenium on alumina catalyst. This apparatus, shown in FIGS. 5 and 6, has decomposed nitrous oxide at rates desirable for a breathing system and remained controllable throughout the test runs.

The mass of the nitrous oxide dissociation reactor system, including tubing, all required fittings, and the instrumentation, is approximately 1.5 kilograms. Although the nitrous oxide dissociation apparatus in FIG. 5 is shown horizontally, in the laboratory it is oriented vertically, with the feed stream at the top; orientation is irrelevant to the operation of the apparatus. In the current configuration, the nitrous oxide feed, measured by flowmeter F1, flows into a quarter inch feed tube that is coaxial with the catalyst bed. A Type K thermocouple (T1) is inserted axially down the feed tube to measure the temperature of the nitrous oxide near the top of the catalyst bed. At the bottom of the feed tube, the $N_2O$ flows into the annular region outside the feed tube that is filled with 3 mm (⅛ inch) cylindrical pellets of ruthenium oxide on alumina catalyst, or other appropriate catalyst type. A second Type K thermocouple at the bottom of the reactor (T2) measures the temperature of the nitrous oxide emerging from the feed tube in what is the primary reaction zone. The products of the nitrous dissociation, nitrogen and oxygen, then flow up the catalyst filled annular region to the product outlet.

To provide start up heating, a 125 watt heat tape is wrapped around the bottom of the nitrous oxide dissociation reactor, near where the $N_2O$ emerges from the feed tube. After $N_2O$ ignition is achieved, the power to the heat tape is turned off. Pressure gauge P1, on the product flow stream, immediately upstream of the pressure regulation valve, records the system pressure.

Figure 6:
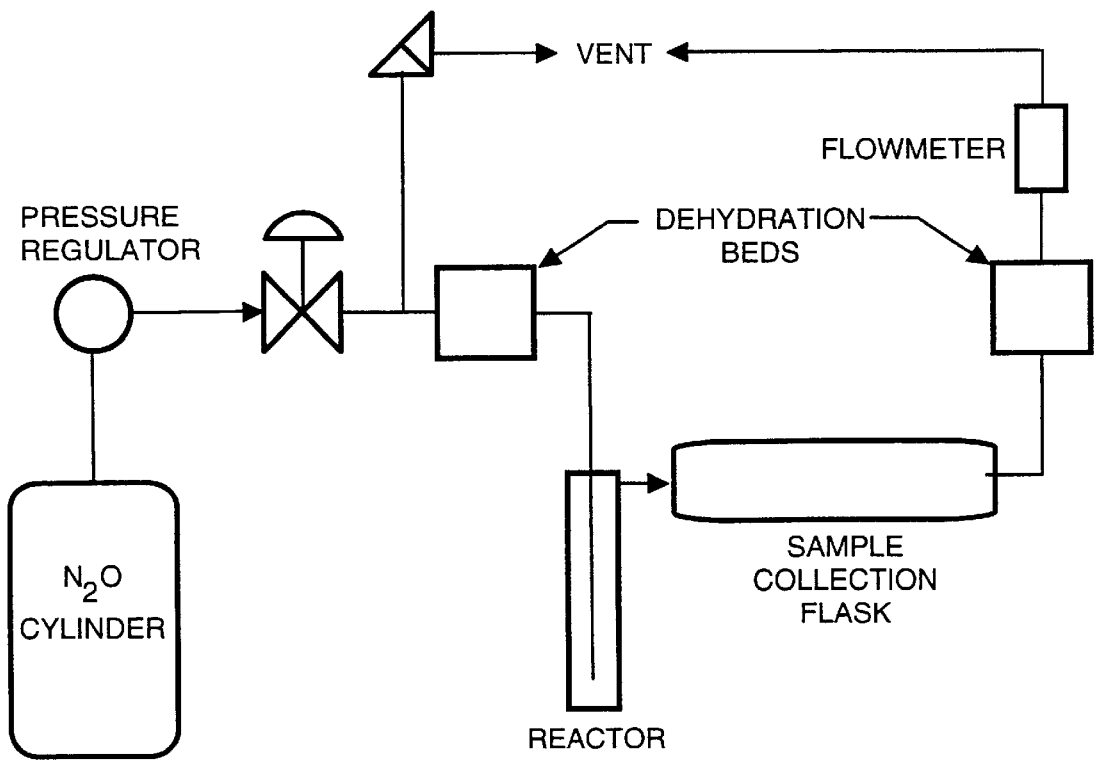
FIG. 6 shows the $N_2O$ decomposition test apparatus developed by the applicants.
Figure 7:
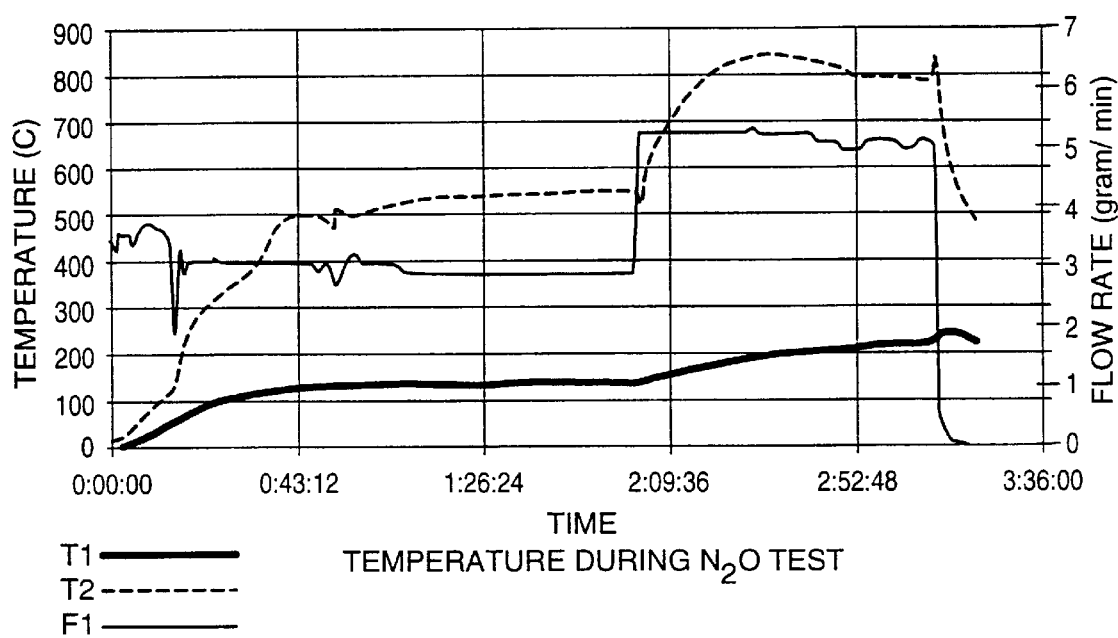
FIG. 7 shows data of the nitrous oxide decomposition reactor.

The machine shown in FIGS. 5 and 6 was run for approximately 50 minutes. Average pressure during this run, as recorded on pressure gauge P1, was approximately 50–52 psig (4.3–4.4 bar). The temperature and flow data (in degrees C. and standard liters per minute, respectively) from this run are shown in the graph in FIG. 6.

The data in FIG. 6 show a good correlation between flow and temperature and excellent stability. Events occurred as follows: At time 0, the external heat tape was turned on. When the temperature reached 150° C., there was a clear gradient in the rate of temperature increase caused by partial dissociation of the nitrous oxide, and the heat tape was turned off at time=15 minutes. The temperature rise eventually leveled out at about 540° C., where heat generation from the dissociation equilibrated with heat loss from the system. The flow was kept stable at this level for a long period, and a sample was taken 1 hour and 56 minutes into the experiment. When analyzed, this sample showed 87% dissociation of the nitrous oxide. Two hours and two minutes into the experiment, the flow rate was increased. As cold nitrous flowed into the system, the temperature spiked downward, but then increased as the additional nitrous started dissociating. The temperature reached a peak level of about 840° C. and then settled back to the equilibrium value of 800° C. Three hours and twelve minutes into the experiment, the flow was stopped. The temperature spiked upward briefly and then dropped sharply, making the expected exponential curve.

The data show that at each set flow, temperature stabilized and remained flat as the nitrous oxide continued to self dissociate. The flow rate of 5 grams per minute corresponds to about 4 standard liters per minute of breathable gas, which is a typical breathing rate for an average person during ordinary exertion.

Additional runs were made. For the additional tests, the 2.5 cm (1 inch) OD steel pipe $N_2O$ reactor was replaced with a 300 cc stainless steel reactor vessel filled with rutherium on alumina catalyst. The new reactor has approximately three times the space time as the previous reactor, and resulted in significantly higher conversions.

This reactor was tested at a feed flow rate of approximately 3 standard liters per minute. At this flow rate, the reaction temperature stabilized at about 800° C. The sample results are as follows:

| COMPONENT | CONCENTRATION (MOLE %) |
|---|---|
| $N_2$ | 66.83% |
| $O_2$ | 31.56% |
| $N_2O$ | 0.11% |
| $NO_2$ | 1.0 ppm |
| NO | Not detected |

This sample shows production of breathable gas mixtures at a flow rate similar to that required by human breathing.

Although the foregoing process and apparatus has been described in terms of certain preferred embodiments and experimental embodiments, other embodiments will become apparent to those of ordinary skill in the art in view of the disclosure herein. Accordingly, the present invention is not intended to be limited by the recitation of preferred embodiments or experimental embodiments, but is intended to be defined solely by reference to the appended claims.

What is claimed is:

1. A system to provide breathing gas to a user by decomposing nitrous oxide to a breathable mixture of oxygen and nitrogen, said system comprising the following components:
   (a) a first storage tank adapted for storing liquid nitrous oxide;
   (b) a first throttling device in line with said tank, said throttling device adapted for feeding vaporized $N_2O$ in a controlled manner;
   (c) a thermal reactor in line with said throttling device, said reactor including means for creating a self sustaining decomposition of the vaporized $N_2O$ to a mixture of breathable gas of approximately one-third oxygen and two thirds nitrogen;
   (d) a second throttling device receiving said breathable gas mixture, said second device feeding the breathable gas mixture in a regulated manner to the user of said system.

2. The system of claim 1 wherein said reactor utilizes a catalyst to decompose the $N_2O$.

3. The system of claim 2 wherein said catalyst is a metal oxide on a catalyst support selected from the group consisting of alumina, magnesia and mixtures thereof.

4. The system of claim 2 wherein said catalyst is selected from the group consisting of cobalt, palladium, copper and mixtures thereof, ion-exchanged with a zeolite selected from the BETA type zeolite group.

5. The system of claim 2 wherein said catalyst is selected from the group consisting of palladium oxide, iridium oxide, osmium oxide, platinum oxide, vanadium oxide, iron oxide, chromium oxide, titanium oxide, nickel oxide, manganese oxide, lanthanum oxide, samarium oxide cerium oxide, praseodymium oxide, neodymium oxide, europium oxide, terbium oxide, gadolinium oxide, thulium oxide, lutetium oxide, ytterbium oxide, erbium oxide, dysprosium oxide, holmium oxide, aluminum oxide, gallium oxide, indium oxide, thallium oxide, scandium oxide, yttrium oxide, beryllium oxide, magnesium oxide, calcium oxide, strontium oxide and barium oxide, on a support selected from the group consisting of alumina, magnesia, zirconia, yttria, calcium oxide, strontium oxide and gallium oxide.

6. The system of claim 2 wherein said catalyst is selected from the group consisting of iron, palladium, platinum, iridium and osmium, ion-exchanged with BETA base zeolite, MOR base zeolite, MFI base zeolite, MEL base zeolite, MER base zeolite and mixtures thereof.

7. The system of claim 2 wherein said catalyst operates at a temperature above about 150° C.

8. The system of claim 2 wherein said catalyst operates at a temperature in the range of about 250° C. to 900° C.

9. The system of claim 1 wherein there is a second storage tank in line with said reactor, said second storage tank for storing a surge volume of the resultant breathable gas mixture.

10. The system of claim 9 further comprising a control system in communication with said reactor and said first throttling device for insuring sufficient flow to said reactor to sustain said reaction.

11. The system of claim 10 wherein said control system utilizes a pressure transducer to detect a pressure differential between said second storage tank and the gas flow pressure into said reactor.

12. The system of claim 1 wherein an additional membrane after the reactor is added to enrich the percentage of oxygen in the breathable gas mixture.

13. The system of claim 1 wherein said system is small enough to fit on the back of a human being.

14. The system of claim 1 wherein the heat generated by the decomposition of nitrous oxide is provided to a suit worn by said user which provides warmth to a wearer of said system.

15. The system of claim 2 wherein an electronic ignition heats the catalyst bed to a temperature above 150° C. prior to $N_2O$ decomposition.

16. The system of claim 1 wherein the effluent gas from said reactor is passed adjacent said inlet gas such that there is heat transfer from said effluent gas to said inlet gas.

17. The system of claim 12 wherein said membrane results in an oxygen level about 70 mole percent.

18. The system of claim 12 wherein there are a plurality of membranes in a series thereby achieving an oxygen level of in excess of 90 mole percent.

19. The system of claim 12 wherein the membrane is used in combination with a recirculating pump to increase the mole percent of oxygen.

20. The system of claim 2 wherein said reactor comprises a container wherein the nitrous oxide gas is introduced into a single capillary which passes through a central region of said container in a longitudinal direction and wherein an exit of said capillary directs the nitrous oxide through a catalyst filled annular region around said capillary, and wherein an exit of said annular region passes around said entrance of said capillary.

21. The system of claim 1 wherein said first storage tank is approximately 10 to 30 cm. in diameter and 20 to 100 cm. in length.

22. The system of claim 9 wherein said second storage tank is designed to hold approximately 1–10 liters of breathable gas at approximately 1 to 40 bar pressure.

23. The system of claim 1 wherein said throttling device is selected from the group consisting of a valve, pump, expander, orifice, regulator, or combinations thereof.

24. A portable system to provide breathing gas to a user by decomposing nitrous oxide to a breathable mixture of oxygen and nitrogen, said system comprising the following components:

(a) a first storage tank adapted for storing liquid nitrous oxide;

(b) a first throttling device in line with said tank, said valve adapted for feeding vaporized $N_2O$ in a controlled manner;

(c) a thermal catalytic reactor in line with said valve, said catalytic reactor comprising a means for heating and a catalyst, which causes a self sustaining decomposition of the vaporized $N_2O$ into a mixture of approximately one-third oxygen and two thirds nitrogen; said catalyst selected from the group consisting of a noble metal or transition metal, on alumina, zirconia, yttria, or a substituted crystalline zeolite support, said catalyst (d) a second storage tank in line with said reactor, said second storage tank for storing a small surge volume of the resultant breathable gas mixture in a pressure vessel;

(e) a second throttling device receiving said breathable gas mixture, said valve feeding the breathable gas mixture in a regulated manner to the user of said system; and (f) a control system in communication with said retainer and said valve for insuring that minimum flow is maintained to sustain reactor temperature and which serves to increase flow to the reservoir when required.

25. A method for providing breathing gas in a system, said method comprising the following steps:

(a) storing liquid nitrous oxide in a first tank having an outlet and providing a thermal reactor;

(b) feeding nitrous oxide from the outlet of said tank in a controlled manner to the thermal reactor;

(c) decomposing the nitrous oxide by heating said reactor to a temperature above about 150–250° C.;

(d) continuing the decomposition of the nitrous oxide in said reactor and producing a breathable gas of approximately one-third oxygen and two-thirds nitrogen; and (e) delivering the breathable gas mixture in a regulated manner to a user.

26. The method of claim 25 wherein said reactor utilizes a catalyst to decompose the $N_2O$.

27. The method of claim 26 wherein said catalyst is a metal oxide on a catalyst support selected from the group consisting of alumina or magnesia.

28. The method of claim 26 wherein said catalyst is selected from the group consisting of cobalt, palladium and copper or mixtures thereof, ion-exchanged with a zeolite selected from the BETA type zeolite group.

29. The method of claim 26 wherein said catalyst is selected from the group consisting of palladium oxide, iridium oxide, osmium oxide, platinum oxide, vanadium oxide, iron oxide, chromium oxide, titanium oxide, nickel oxide, manganese oxide, lanthanum oxide, samarium oxide cerium oxide, praseodymium oxide, neodymium oxide, europium oxide, terbium oxide, gadolinium oxide, thulium oxide, lutetium oxide, ytterbium oxide, erbium oxide, dysprosium oxide, holmium oxide, aluminum oxide, gallium oxide, indium oxide, thallium oxide, scandium oxide, yttrium oxide, beryllium oxide, magnesium oxide, calcium oxide, strontium oxide and barium oxide, on a support selected from the group consisting of alumina, magnesia, zirconia, yttria, calcium oxide, strontium oxide and gallium oxide.

30. The method of claim 26 wherein said catalyst is selected from the group consisting of iron, palladium, platinum, iridium and osmium, ion-exchanged with a BETA base zeolite, MOR base zeolite, MFI base zeolite, MEL base zeolite, MER base zeolite and mixtures thereof.

31. The method of claim 26 wherein said catalyst operates at a temperature above about 150° C.

32. The method of claim 26 wherein said catalyst operates at a temperature in the range of about 250° C. to 900° C.

33. The method of claim 25 wherein there is a second tank in line with said reactor, said second tank for storing a surge volume of the resultant breathable gas mixture.

34. The method of claim 25 further comprising a control system in communication with said reactor and said throttling device for insuring sufficient flow to said reactor to sustain said reaction.

35. The method of claim 34 wherein said control system utilizes a pressure transducer to detect a pressure differential between said second storage tank and the gas flow into said reactor.

36. The method of claim 25 wherein an additional membrane after the reactor is added to enrich the percentage of oxygen in the breathable gas mixture.

37. The method of claim 25 wherein said system is small enough to fit on the back of a human being.

38. The method of claim 25 wherein the heat generated by the decomposition of nitrous oxide is provided to a suit worn by said user which provides warmth to a wearer of said system.

39. The method of claim 25 wherein an electronic ignition heats the catalyst bed to a temperature above 150° C. prior to $N_2O$ decomposition.

40. The method of claim 25 wherein the effluent gas from said reactor is passed adjacent said inlet gas such that there is heat transfer from said effluent gas to said inlet gas.

41. The method of claim 36 wherein said membrane results in an oxygen level about 70 mole percent.

42. The method of claim 36 wherein there are a plurality of membranes in a series thereby achieving an oxygen level of in excess of 90 mole percent.

43. The method of claim 36 wherein the membrane is used in combination with a recirculating pump to increase the mole percent of oxygen.

44. The method of claim 26 wherein said reactor comprises a container wherein the nitrous oxide gas is introduced into a single capillary which passes through a central region of said container in a longitudinal direction and wherein an exit of said capillary directs the nitrous oxide through a catalyst filled annular region around said capillary, and wherein an exit of said annular region passes around said entrance of said capillary.

45. The method of claim 25 wherein said first tank is approximately 10 to 30 cm. in diameter and 20 to 100 cm. in length.

46. The method of claim 33 wherein said second storage tank is designed to hold approximately 1–10 liters of breathable gas at approximately 1 to 40 bar pressure.

47. The method of claim 25 wherein said throttling device is selected from the group of a valve, pump, expander, orifice, regulator, or combinations thereof.

* * * * *